United States Patent [19]

Laval, Jr.

[11] 4,148,735

[45] Apr. 10, 1979

[54] SEPARATOR FOR USE IN BOREHOLES OF LIMITED DIAMETER

[76] Inventor: Claude C. Laval, Jr., 2444 N. Farris Ave., Fresno, Calif. 93705

[21] Appl. No.: 930,681

[22] Filed: Aug. 3, 1978

[51] Int. Cl.[2] .............................................. B01D 21/26

[52] U.S. Cl. ............................. 210/512 R; 55/459 R; 166/105.1; 209/211

[58] Field of Search .................... 210/512 R; 209/144, 209/211; 166/105.1; 55/448, 449, 459 R, 459 A, 459 D

[56] References Cited

U.S. PATENT DOCUMENTS

| | | | |
|---|---|---|---|
| 3,235,091 | 2/1966 | Doll etal. | 209/211 X |
| 3,289,608 | 12/1966 | Laval, Jr. | 55/455 X |
| 3,512,651 | 5/1970 | Laval, Jr. | 209/211 X |
| 3,670,480 | 6/1972 | Peterson | 55/449 X |
| 3,947,364 | 3/1976 | Laval, Jr. | 210/521 R |
| 3,963,073 | 6/1976 | Laval, Jr. | 166/105.1 |
| 4,072,481 | 2/1978 | Laval, Jr. | 55/177 |

*Primary Examiner*—William A. Cuchlinski, Jr.
*Attorney, Agent, or Firm*—Huebner & Worrel

[57] ABSTRACT

A separator, for use in boreholes of limited diameter, having a vortex chamber adapted to be received in the borehole having upper and lower ends and including a sidewall constituting a surface of revolution; a tubular vortex finder concentrically disposed in the upper end of the chamber defining an annular throat therebetween; a swirling chamber interconnecting the upper end of the vortex chamber and the vortex finder and providing a surface of revolution of larger diameter than the vortex chamber disposed concentrically thereabout; and an axially facing, swirl inducing inlet extended outwardly of the chamber to admit fluid from the borehole into the swirling chamber and through the throat for centrifuging flow in the vortex chamber.

10 Claims, 12 Drawing Figures

SEPARATOR FOR USE IN BOREHOLES OF LIMITED DIAMETER

BACKGROUND OF THE INVENTION

1. Field of the Invention

The present invention relates to a separator for use in boreholes of small diameter, and more particularly to such a separator for centrifugally separating particulate matter from a fluid, such as water, the separator being inserted into such a borehole below a fluid level therein and connected to the inlet of a pump for withdrawing the fluid from the borehole.

2. Description of the Prior Art

The prior art includes a variety of centrifugal devices for separating particulate matter from a fluid. It is well known to connect such a separator to the inlet of a pump which, together with the separator, is inserted into a borehole and submerged in the fluid.

However, difficulties arise when such a separator is utilized in a borehole whose diameter is not substantially larger than the external dimensions of the separator so that the space between the separator and the wall of the borehole is constricted. Since separation of the particulate matter involves downward flow within the separator, such separators require an inlet for the fluid in their upper portion. The fluid must, therefore, flow through the constricted space between the separator and the borehole to reach the inlet. If the flow area is sufficiently restricted, there is an excessive pressure loss in drawing the fluid from the borehole into the inlet. This pressure loss is increased when, as is usually the case, the wall of the bore is rough and uneven. Another difficulty is physical interference between the separator and the wall of the borehole when running the separator into or from the borehole or during operation. Such movement of the separator is even more difficult when the weight of the separator is substantial. Further, if the flow area is sufficiently restricted, fluid is drawn inwardly through a tail pipe normally provided for the exhaust of particulate matter thus defecting the intended operation.

OBJECTS AND SUMMARY OF THE INVENTION

Accordingly, it is an object of the present invention to provide an improved separator for use in boreholes of limited diameter.

Another object is to provide such a separator which minimizes pressure drop in fluid flowing to and through the separator.

Another object is to provide such a separator which is adapted to receive fluid flowing upwardly or downwardly within the borehole toward an inlet therefor in the separator with minimal pressure loss.

Another object is to provide such a separator configured to facilitate its insertion into the borehole and its removal therefrom.

Another object is to provide such a separator which is relatively light in weight.

Further objects and advantages are to provide improved elements and arrangements thereof in a separator which is economical, durable, dependable, and fully effective in accomplishing its intended purposes.

PRIOR ART STATEMENT

Characterizing the closest prior art of which the applicant is aware and in compliance with 37 C.F.R. ¶1.97 and ¶1.98, attention is invited to the following patents issued to the applicant, copies of which are attached:

| Patent No. | Date |
|---|---|
| 3,289,608 | April 23, 1965 |
| 3,963,073 | June 15, 1976 |
| 4,072,481 | Feb. 7, 1978 |

U.S. Pat. No. 3,289,608 is believed to be relevant in its disclosure in FIG. 1 of a separator having fluid inlets through a downwardly converging conical wall. This patent, and U.S. Pat. Nos. 3,963,073 and 4,072,481 disclose the use of a fluid separator received in a borehole.

DESCRIPTION OF THE PREFERRED EMBODIMENTS

First Form

Figure 1:
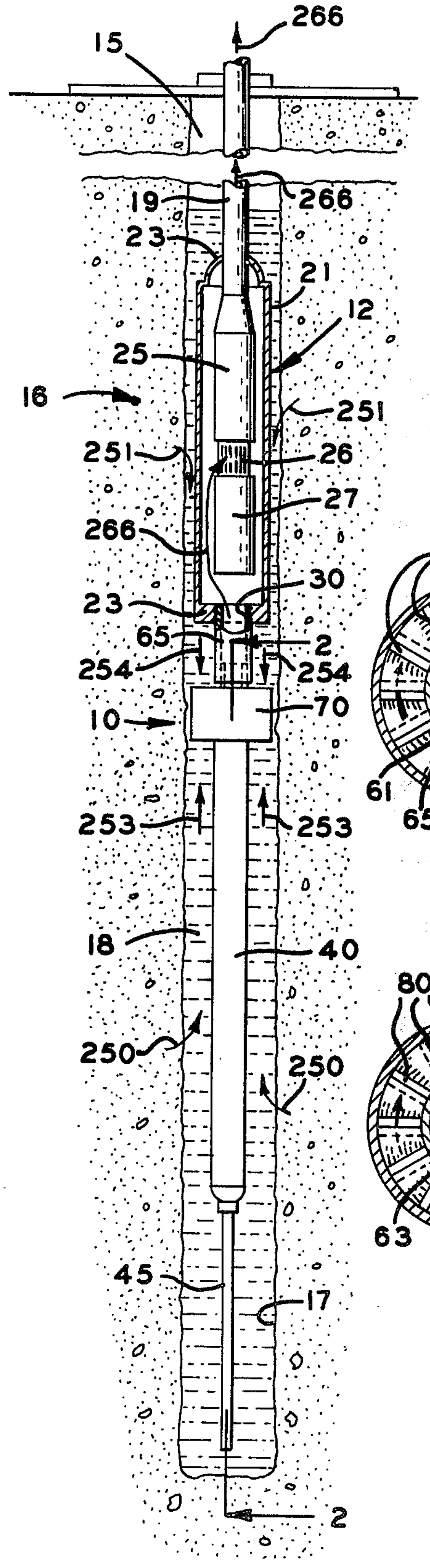
FIG. 1 is a vertical section of a borehole and surrounding earth formation having a first form of separator embodying the principles of the present invention received in the borehole together with a submersible pump and motor assembly.

Referring more particularly to the drawings, a separator of the first form of the present invention is shown in FIGS. 1 through 4 and is generally indicated by the numeral 10. In FIG. 1 the separator is shown in an operating position supported by and connected for fluid flow to a submersible pump and motor assembly 12 of well known form which is above the separator. The separator and the pump assembly are received in a borehole 15 in a surrounding earth formation 16 which provides a relatively rough inside wall 17 for the borehole. The borehole contains a quantity of fluid 18 such as water, carrying particulate matter, such as sand, therein. The surface of the fluid is substantially above the pump assembly. The assembly and the separator are supported from the earth surface by any suitable means such as a discharge pipe 19 extending substantially vertically from the assembly within the borehole.

The pump assembly 12 includes a cylindrical housing 21 concentric with the pipe 19. The housing is closed to fluid flow directly from the borehole 15 by a pair of axially opposite heads 23. The pipe extends through the upper of these heads to a pump 25. The upper end of the pump is connected to the pipe for fluid flow and support. The lower end of the pump is connected to a relatively short perforated pipe 26 through the perforations of which fluid enters the pump. A pump drive motor 27 is mounted in said housing downwardly of the perforated pipe. The motor is electrically energized from the earth surface in its well known manner. A bore 30 provided with internal screw threads extends axially through the lower of the heads 23.

Figure 2:
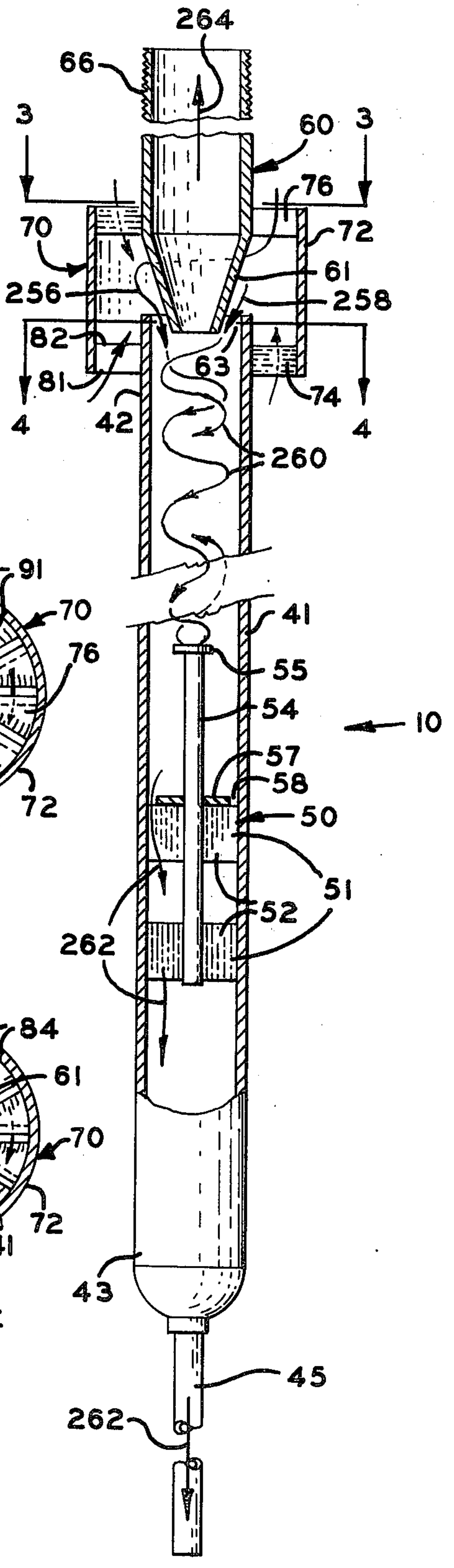
FIG. 2 is a somewhat enlarged vertical section of the separator taken on line 2—2 of FIG. 1.

The first form 10, as shown in FIGS. 1 and 2, includes a cylindrical vortex chamber 40 having a substantially vertical axis substantially aligned with the axis of the pump assembly 12. This chamber has a cylindrically tubular sidewall 41, an open upper end portion 42, and a substantially closed lower end portion 43. A tail pipe 45 extends downwardly from the lower end of the vortex chamber to discharge particulate matter removed from the fluid 18 by the separator.

The vortex chamber includes a stand 50 mounted therein approximately at the center thereof. The stand has a pair of vertically spaced, cross shaped brackets 51, each of which includes a plurality of plates 52 extending radially inwardly from the sidewall 41 of the chamber. The stand has a tube 54 coaxially related to the chamber and intersected by the plates. The tube is fixed to the plates and extends upwardly from the bottom of the lower of the brackets to a point substantially above the upper of the brackets. The upper end of the tube has a circular, imperforate reaction plate 55 mounted concentrically thereon. The stand has an annular partition 57 concentrically mounted on the tube in upwardly juxtapositioned relation with the upper of the brackets. The outer diameter of the partition is less than the inner diameter of the sidewall so that an annulus 58 is defined therebetween.

The stand 50 and the reaction plate 55 and annular partition 57 mounted thereon are not necessary to the practice of the present invention, but are highly advantageous in the effective separation of particulate matter from the fluid 18 in the vortex chamber 40 as described in the applicant's U.S. Pat. No. 3,512,651 issued on May 19, 1970.

Figure 3:
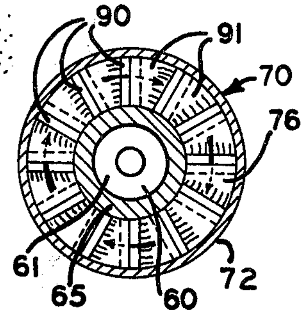
FIG. 3 is a transverse section taken at the position indicated by line 3—3 of FIG. 2.

The first form 10 has a tubular vortex finder 60 best shown in FIGS. 2 and 3. The vortex finder is concentric to the vortex chamber 40 and is upwardly and downwardly open. The vortex finder includes a frusto-conical lower portion 61 having its base or end of larger diameter upwardly disposed. The opposite, lower end of the frusto-conical portion is smaller in diameter than the interior of the vortex chamber and is extended downwardly into its open upper end portion 42 defining therebetween an annular throat 63. The vortex finder has a cylindrical upper portion having substantially the same diameter as the base of the frusto-conical portion. The upper end of said cylindrical portion is provided with external screw threads 66. These threads are engaged in fluid tight relation with the screw threads of the bore 30 in the housing 21, thereby mounting the separator on the pump assembly 12 for fluid communication therebetween.

The separator 10 has a swirling chamber 70 shown in FIGS. 1 through 4. This chamber has a cylindrical sidewall 72 disposed concentrically of the vortex finder 60 and extended outwardly from the vortex chamber 40 and from the vortex finder 60. The inner diameter of this sidewall is substantially larger in diameter than the exterior diameter of the vortex chamber and of the vortex finder. The exterior diameter of this sidewall is appreciably less than the diameter of the borehole 15. Axially of the separator, this sidewall extends downwardly from the base of the frusto-conical portion 61 of the vortex finder 60 to a position below the open upper end of the vortex chamber. The swirling chamber has a lower annular portion or swirl inducing plate 74 extending outwardly from the vortex chamber to the lower end of said sidewall. The plate has an inner circular edge directly connected to the vortex chamber and an outer circular edge directly connected to the sidewall. This plate is disposed in a plane normal to the axis of the separator and in concentric circumscribing relation to the vortex chamber. The swirling chamber has a second annular portion or upper swirl inducing plate 76 formed similarly to said lower plate, but extending outwardly from the vortex finder to said sidewall in circumscribing relation therewith. The swirling chamber thus interconnects the vortex chamber and the vortex finder at a position above the vortex chamber, thereby covering the throat 63.

The lower annular plate 74 has a plurality of inlets or fluid admission ports 80 for admission of the fluid 18 in the borehole 15 into the swirling chamber 70. The inlets face downwardly between the vortex chamber and the wall 17 of the borehole and are oblique to the plane of said plate so that the fluid is admitted in a direction tangential to a circle concentric to the axis of the vortex chamber 40. Each inlet port has, therefore, a downwardly facing intake end 81 and an upwardly facing outlet end 82. The inlet ports are defined by a plurality of vanes 84 which extend radially in equal angularly spaced relation from the vortex chamber and are oblique to the plane of the plate.

The upper annular plate 76 is similar to the plate 74, and has a plurality of second fluid inlets 90 for admission of the fluid 18 into the swirling chamber 70. These inlets are defined by a plurality of vanes 91 extending radially from the vortex finder 60. The inlets face upwardly between the wall 17 of the borehole and the cylindrical portion 65 of the vortex finder 60. The inlets are disposed so that fluid admitted through them is directed about a circle concentric to the axis of the vortex chamber 40 in the same direction as fluid admitted through the inlets 80 of the lower annular plate 74.

It should be understood that the inlets 80 and 90 can be formed in any suitable manner, as by bores extending obliquely through the plates 74 and 76. The separator 10 can also be constructed with an imperforate plate substituted for the upper plate 76 so that fluid 18 can only enter the swirling chamber 70 from between the wall 17 of the borehole 15 and the vortex chamber 40. In any event, the total inlet flow area for fluid entering the swirling chamber 70 should be at least equal to the flow area for fluid flowing through the vortex finder 60.

As best shown in FIGS. 1 through 4, fluid flow communication exists from within the borehole 15 through the tangentially directed inlets 80 and 90 into the swirling chamber 70, and downwardly therefrom through the throat 63 into the vortex chamber 40. From the vortex chamber, fluid flow communication exists upwardly through the vortex finder 60 into the housing 21 of the submersible pump assembly 12. The pump 25 is adapted to draw fluid within the housing into the perforated pipe 26 and expel the fluid upwardly through the pipe 19 and from the borehole when the motor 27 is energized.

Second Form

Figure 5:
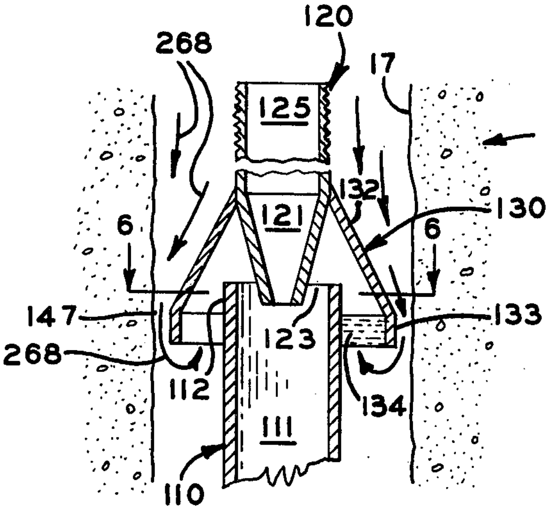
FIG. 5 is a fragmentary vertical section of the upper portion of a second form of separator of the present invention.
Figure 6:
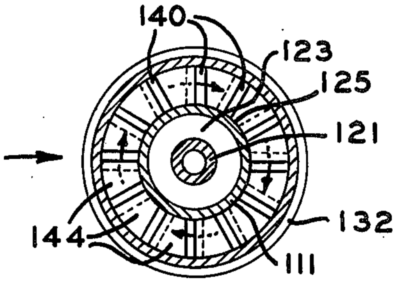
FIG. 6 is a transverse section of the separator of FIG. 5 taken at the position indicated by line 6—6 of FIG. 5.

A second form of separator of the present invention is designated by the numeral 100 and is shown in FIGS. 5 and 6. The second form has a cylindrical vortex chamber 110 which is substantially identical to the vortex chamber 40 of the first form 10, having a sidewall 111 and being provided with an open upper end 112. The second form has a vortex finder 120, substantially identical to the vortex finder 60 of the first form. The vortex finder of the second form has a lower frusto-conical portion 121 extended into the upper end 112 of the vortex chamber 110 defining a throat 123 therebetween and has an upper cylindrical portion 125. However, the second form has a modified swirling chamber 130 substituted for the swirling chamber 70 of the first form. The swirling chamber 130 has an imperforate frusto-conical sidewall 132 coaxially related to the vortex chamber 110 and to the swirling chamber 130. The sidewall has an end of larger diameter or base end 133 downwardly disposed. Axially, this base end is positioned adjacent to and somewhat below the upper end 112 of the vortex chamber. The sidewall converges upwardly from this base end to the vortex finder at the junction between its frusto-conical portion 121 and its cylindrical portion 125. The swirling chamber has an annular swirl inducing plate 134 which is substantially identical to the plate 74 of the first form 10 and which extends outwardly from the vortex chamber to said base end in a plane normal to the axis of the vortex chamber. The plate is provided with a plurality of inlets 140, defined between radially extending vanes 144, for admission of fluid 18 upwardly from between the vortex chamber and a wall 17 of a borehole 15 into the swirling chamber, as shown in FIG. 1. Axially of the vortex chamber, the inlets are thus adjacent to said base end of the swirling chamber. The inlets admit the fluid tangentially to a circle concentric to the axis of the vortex chamber. The frusto-conical sidewall 132 and the borehole wall 17 define therebetween a downwardly converging, annular passage 147 disposed above said inlets.

Third Form

Figure 7:
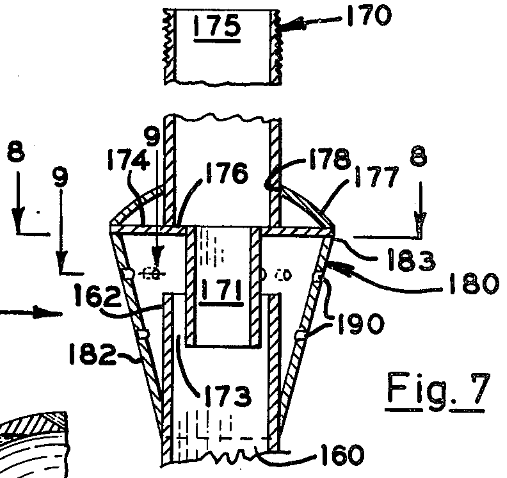
FIG. 7 is a fragmentary vertical section of the upper portion of a third form of the separator of the present invention.
Figure 8:
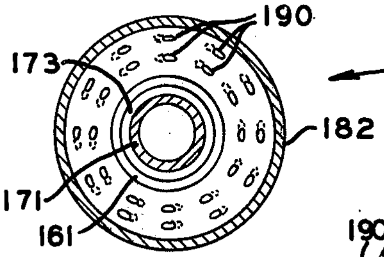
FIG. 8 is a transverse section of the separator of FIG. 7 taken at the position indicated by line 8—8 of FIG. 7.

A third form 150 of the present invention is illustrated in FIGS. 7 and 8. It has a vortex chamber 160 which is substantially identical to the chamber 40 of the first form 10, having a cylindrical sidewall 161 and an open upper end portion 162.

However, the third form 150 has a tubular vortex finder 170 somewhat different from the vortex finder 60 of the first form. The vortex finder of the third form has a lower cylindrical portion 171 which is substantially smaller in diameter than the vortex chamber and is extended axially into said upper end portion 162 in concentric relation therewith defining an annular throat 173 therebetween. This lower cylindrical portion extends upwardly from the throat for a substantial distance. An annular plate 174 circumscribes the upper end of the lower cylindrical portion and is extended therefrom normally to the axis of the vortex chamber. The outer diameter of the annular plate is approximately twice the diameter of the vortex chamber. The vortex finder includes an upper cylindrical portion 175 coaxially related to the lower portion, but having approximately the same diameter as the vortex chamber. The annular plate thus has an inner annular portion 176 interconnecting the lower and upper portions of the vortex finder. This upper portion extends upwardly from the annular plate for connection to a submersible pump assembly 12, as in the first form 10.

The third form 150 has a dome 177 concentrically mounted on and extended upwardly from the annular plate 174. The dome is fractionally spherical in form and has a central circular opening 178 for extension therethrough of the upper cylindrical portion 175 of the vortex finder 170. The periphery of the dome has substantially the same diameter as said plate and is fixed to the periphery thereof. The volume defined between the dome, said annular plate, and the upper portion of the vortex finder may or may not be in fluid tight relation with the borehole 15.

The third form 150 has a swirling chamber 180 concentric with the vortex chamber 160. The swirling chamber includes a frusto-conical sidewall 182 having its larger or base end 183 upwardly disposed. The base end has substantially the same diameter as the periphery of the annular plate 174 and is fixed thereto. The peripheries of the plate and of the dome 177 are thus interconnected with this base end and form an upwardly convex closure for the swirling chamber. The sidewall converges downwardly from the annular plate to the vortex chamber at a position adjacent to its upper end.

The swirling chamber 180 is provided with a plurality of inlet bores 190 extending through the sidewall 182 about individual axes tangential to a circle concentric with the vortex chamber. The bores are arranged in a plurality of vertically spaced circles concentric with the sidewall and are disposed in substantially equally angularly spaced relation in each circle.

Fourth Form

Figure 9:
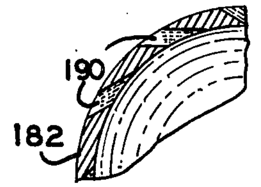
FIG. 9 is a fragmentary section taken at the position indicated by line 9—9 of FIG. 7 showing a plurality of inlets utilized with the third form of the invention.
Figure 10:
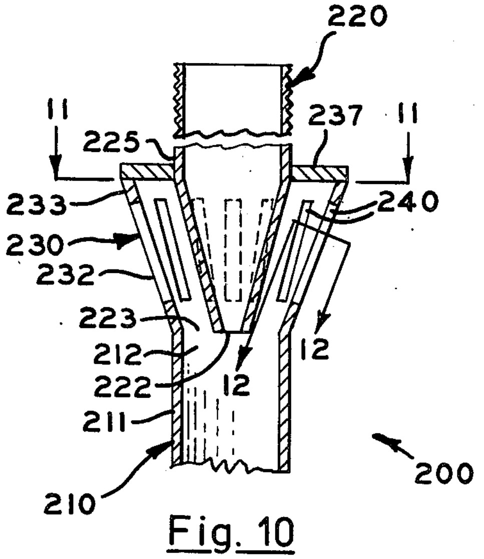
FIG. 10 is a fragmentary vertical section of the upper portion of a fourth form of the separator of the present invention.
Figure 11:
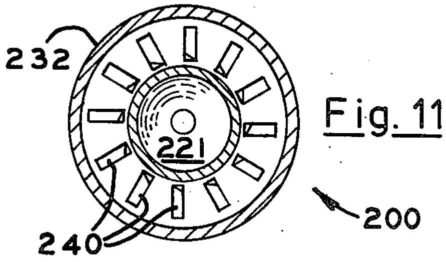
FIG. 11 is a transverse section of the separator of FIG. 10 taken at a position indicated by line 11—11 of FIG. 10.
Figure 12:
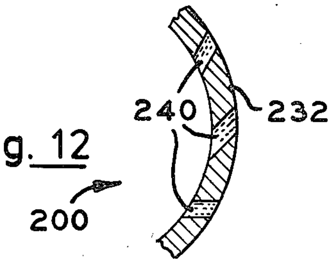
FIG. 12 is a fragmentary section taken at the position indicated by line 12—12 of FIG. 10 showing a plurality of inlets utilized with the fourth form.

The fourth form 200 of separator is shown in FIGS. 9 and 10 and has a vortex chamber 210 substantially identical in form to the vortex chamber 40 of the first form 10, having a cylindrical sidewall 211 and an open upper end portion 212. The fourth form has a tubular vortex finder 220 substantially identical in form to the vortex finder 60 of the first form, having a lower, frusto-conical portion 221 and a lower end 222 substantially smaller in diameter than the vortex finder. The vortex finder is disposed concentrically with the vortex chamber, however, the axial relation of the vortex finder and the vortex chamber is modified from that in the first three forms 10, 100, and 150. In the fourth form, said lower end of the vortex finder is disposed substantially in the plane of the open upper end of the vortex chamber instead of extending a substantial distance axially therein. The lower end of the vortex finder and the upper end of the vortex chamber define an annular throat 223 therebetween. The vortex finder has an upper, cylindrical portion 225 for connection to a submersible pump assembly 12, as in the other forms.

The fourth form 200 of the separator has a swirling chamber 230 interconnecting the vortex finder 220 with the upper end 212 of the vortex chamber 210. The swirling chamber has a frusto-conical sidewall 232 coaxially related to the vortex chamber. This sidewall has an upwardly disposed larger diameter or base end 233 which has a diameter approximately twice the diameter of the vortex chamber 210. The base end is aligned axially with the junction between the frusto-conical portion 221 and the cylindrical portion 225 of the vortex finder 220. The sidewall has a lower end having substantially the same diameter as the vortex chamber. This lower end is joined to the upper end of the vortex chamber. The swirling chamber is closed upwardly by an imperforate annular plate 237 extending from the base end of the sidewall to the junction between the cylindrical and frusto-conical portions of the vortex finder.

The swirling chamber 230 is provided with a plurality of elongated inlet slots 240 extending through the sidewall 232. The slots are equally spaced angularly about the sidewall and extend longitudinally downwardly from the plate 237 closing the chamber toward the vortex chamber 210. The slots extend through the sidewall tangentially to a circle concentric to the axis of the vortex finder.

OPERATION

The operation of the described embodiments of the present invention is believed to be clearly apparent and is briefly summarized at this point. As shown in FIG. 1, the first form 10 of separator and the pump assembly 12 are received in a borehole 15. The portion of the separator having the largest diameter, which is the sidewall 72 of the swirling chamber 70, is only appreciably smaller in diameter than the borehole. The borehole is, therefore, limited in diameter and in area in relation to the diameter and area required for a prior art separator having the same overall diameter as the separator of the first form.

The fluid 18 enters the borehole 15 from the earth formation 16 both below and above the separator as indicated, respectively, by the arrows 250 and 251. However, in many such boreholes all, or substantially all, of the fluid enters the borehole from only one of these locations. Electrical energization of the motor 27 causes the pump 25 to be driven thereby producing, in a well known manner, a fluid pressure differential between the borehole 15 and the perforated pipe 26. This differential urges a stream of the fluid to flow from the borehole through the first form 10 of the separator and into the housing 21.

Figure 4:
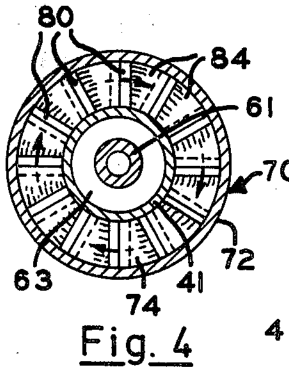
FIG. 4 is a transverse section taken at the position indicated by line 4—4 of FIG. 2.

As shown in FIGS. 1 and 2, the fluid 18 in the borehole 15 together with the particulate matter therein is urged to flow by said pressure differential generally parallel to the axis of the first form 10 of the separator. Such flow occurs upwardly along the vortex chamber 40 in the space between the exterior thereof and the wall 17 of the borehole toward the inlets 80 in the lower swirl inducing plate 74, as indicated by the arrows 253. Such flow also occurs downwardly toward the inlets 90 in the upper swirl inducing plate 76, as indicated by the arrows 254. As shown in FIGS. 2 and 4, the fluid enters these inlets and is directed into the swirling chamber 70 tangentially to a circle concentric with said axis by the lower inlet vanes 84 and the upper inlet vanes 91. This tangential direction imparted to the fluid causes it to swirl within the chamber and about the vortex chamber 40, as indicated by the arrows 256. Since the stream of fluid flowing through the upper fluid inlets is directed in the same direction as the stream of fluid flowing through the lower inlets, the two streams merge within the swirling chamber into a single stream which swirls downwardly through the throat 63 and into the vortexing chamber, as indicated by the arrows 258.

The fluid entering the vortex chamber 40 continues to swirl downwardly therein so that the particulate matter is urged outwardly by centrifugal force. As indicated by the arrows 260, the fluid vortexes toward the axis of the chamber and downwardly toward the reaction plate 55. This plate "reflects" such fluid upwardly in convergent vortexing return flow toward the open lower end of the frusto-conical portion 61 of the vortex finder 60. Centrifuging separation of the particulate matter continues during this vortexing flow toward and from the reaction plate. As indicated by the arrows 262, the separated particulate matter descends downwardly in the chamber through the annulus 58 into the lower end portion 43 of the chamber. The particulate matter, typically, is gravitationally removed from the vortex chamber through the tail pipe 45 and returned to the borehole 15. After almost all of the particulate matter has been removed, the fluid remaining flows upwardly through the vortex finder and into the housing 21 of the pump assembly 12, as indicated by the arrow 264. After leaving the first form 10, the fluid flows through the pump assembly, pipe 19, and from the borehole 15, as indicated by the arrows 266 in FIG. 1.

The first form 10 of separator admits fluid 18 flowing axially of the borehole through the two relatively large annular areas defined between the borehole wall 17 and, respectively, the vortex chamber 40 and the vortex finder 60. Such flow through a relatively large area requires a lower velocity for a given rate of flow of the fluid and results in a lower pressure drop. The pressure drop is further minimized because the bulk of the flow does not pass adjacent to the sidewall which is often rough and creates turbulence in the fluid. Since fluid does not enter the separator radially, the diameter of the vortex chamber is limited only by the clearance between it and the borehole required to insert the separator into the borehole or remove it therefrom. As a result a larger separator having greater capacity and/or more effective separation can be utilized in a borehole of a given diameter. The simplicity of the swirl inducing elements, the plates 74 and 76, of the separator results in it being relatively light in weight as well as economical to construct. The first form of separator, because of its axially oppositely disposed inlets 80 and 90, is particularly advantageous when fluid enters the borehole both above and below the separator as indicated, respectively, by the arrows 250 and 251.

The operation of the second form 100, third form 150, and fourth form 200 of the separator of the present invention is generally similar to the operation of the first form, and these forms possess the same general advantages as the first form. These forms of the separator do not have the bi-directional fluid inlets 80 and 90 of the first form, but their structures are particularly advantageous in certain circumstances. For example, the third and fourth forms, by utilizing the frusto-conical sidewalls 180 and 232 can provide substantially larger openings 190 and 240 for increased influx, greater capacity and increased efficiency.

The second form 100 of separator is characterized, as shown in FIGS. 4 and 5, by the downwardly diverging frusto-conical sidewall 132 of its swirling chamber 130. This shape of sidewall is advantageous when removing the separator from a borehole 15 since it does not tend to "snag" irregularities in the wall 17. This form also facilitates the passage of material, which has fallen from the earth formation 16 above the separator, past the separator for disposal downwardly below it in the borehole. This sidewall shape is also advantageous when fluid enters the borehole above the separator since the smoothly converging passage 147 between the sidewall and the borehole wall guides the fluid toward the inlets 140 as indicated by the arrows 268 in FIG. 5.

The third form 150 of separator, shown in FIGS. 7, 8, and 9, is advantageous when there is danger of engaging the wall 17 of the borehole 15 both on inserting the separator into the borehole and on withdrawing it therefrom. The upwardly disposed dome 177 facilitates withdrawal, and the downwardly converging, frusto-conical sidewall 161 of the vortex chamber 160 facilitates insertion. This form utilizes a vortex finder 170 having a cylindrical portion 171 extended into the upper end portion 162 of the vortex chamber rather than a frusto-conical member 61, 121, or 221 as utilized, respectively, in the first form 10, second form 100 and fourth form 200. Either shape of vortex finder can be used with a separator otherwise substantially identical to either of said forms. The cylindrical form is relatively more economical to construct, however, the frusto-conical form results in less turbulence through the throat between the vortex finder and vortex chamber thereby increasing the swirling velocity for greater flow and more effective separation.

The fourth form 200 of the separator is of particularly simple and economical construction and is easily inserted into a borehole 15 due to the use of a swirling chamber 230 having a downwardly converging, frusto-conical sidewall 232. This form shows the use with such a sidewall of inlet slots 240 instead of bores such as the bores 190 in the third form 150.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A separator for use in boreholes of limited diameter containing fluid with particulate matter therein comprising:
- (A) a vortex chamber having an inwardly disposed surface of revolution concentric to an axis and upper and lower end portions;
- (B) a vortex finder extended concentrically in the upper end of the vortex chamber and therebetween defining an annular throat; and
- (C) a swirling chamber interconnecting the upper end portion of the vortex chamber and the vortex finder having an inwardly disposed surface of revolution concentrically about the axis, the swirling chamber having an annular portion circumscribing the vortexing chamber and outwardly extended therefrom having an inlet therethrough facing downwardly exteriorly of the vortexing chamber to receive fluid upwardly therein disposed tangentially to a circle concentric to the axis to impart a swirling action to fluid admitted to the swirling chamber, and communicating through the swirling chamber and the throat with the vortexing chamber to swirl the fluid therein to centrifuge particulate matter from the fluid for descent in the vortexing chamber and return flow of the fluid out of the vortex finder.

2. A separator for use in boreholes of limited diameter containing fluid with particulate matter therein comprising:
- (A) a vortex chamber adapted to be received in such a borehole having an inwardly disposed surface of revolution concentric to an axis, upper and lower end portions, and an outer diameter appreciably less than the inner diameter of such a borehole;
- (B) a vortex finder extended concentrically in the upper end of the vortex chamber and therebetween defining an annular throat communicating with the interior of the vortex chamber; and
- (C) a swirling chamber interconnecting the upper end portion of the vortex chamber and the vortex finder at a position above the chamber having an inwardly disposed surface of revolution concentrically about the axis, an inner diameter greater than the exterior diameter of the chamber and of the vortex finder and an outer diameter less than the diameter of the borehole, said swirling chamber having an annular portion circumscribing the vortexing chamber and outwardly extended therefrom, and the annular portion having an inlet therethrough positioned to face downwardly between the vortexing chamber and the wall of the borehole to admit fluid therefrom, disposed tangentially to a circle concentric to the axis to impart a swirling action to fluid admitted to the swirling chamber, and communicating through the swirling chamber and the throat with the vortexing chamber to swirl the fluid therein to centrifuge particulate matter from the fluid for descent in the vortexing chamber and return flow of the fluid out of the vortex finder.

3. The separator of claim 2 in which the flow area of said fluid inlet through said annular portion of the swirling chamber which imparts said swirling action is at least equal to the flow area of the fluid from the vortex finder.

4. The separator of claim 2 in which the swirling chamber has a second annular portion circumscribing the vortex finder and outwardly extended therefrom having a second fluid inlet therethrough positioned to face upwardly between the vortex finder and the wall of the borehole to admit fluid therefrom into the swirling chamber, the inlet being disposed tangentially to a circle concentric to the axis to impart a swirling action to the fluid admitted through said inlet in the same direction as the fluid admitted into the swirling chamber through the downwardly facing inlet so that the fluid flowing through the second inlet merges with the fluid flowing through said downwardly facing inlet for flow therewith through the throat and centrifuging in the vortex chamber.

5. A fluid separator for use in boreholes of limited diameter comprising:
- (A) a vortex chamber adapted to be received by such a borehole having:
  - (1) a side wall providing an inwardly disposed surface of revolution concentric to an axis,
  - (2) an external diameter less than the diameter of the borehole,
  - (3) an upper end, and
  - (4) a lower end;
- (B) a vortex finder having:
  - (1) a lower end disposed concentrically in the upper end of the vortex finder of a diameter less than the internal diameter of the vortex chamber so as to define a throat therebetween; and
- (C) a swirling chamber interconnecting the upper end portion of the vortex chamber and the lower end portion of the vortex finder in covering relation to the throat and having:

(1) an internal surface of revolution of a diameter greater than that of the vortex chamber disposed concentrically to said axis, (2) an external surface of a diameter less than the internal diameter of the borehole, and (3) an inlet in said surface of revolution facing downwardly externally of the vortex chamber tangential to a cylinder concentric to the axis and oblique to a plane normal to the axis so as to admit fluid moving upwardly along the vortex finder, said inlet being in communication with the vortex finder through the swirling chamber and the throat.

6. The separator of claim 5 in which the vortex finder is of frusto-conical form with the base upwardly disposed.

7. The separator of claim 5 in which said external surface of the swirling chamber includes a surface of revolution upwardly converging to the vortex finder and having its portion of greatest diameter disposed in axially adjacent relation to said inlet.

8. The separator of claim 5 in which the swirling chamber includes a frusto-conical sidewall having a base end disposed substantially upwardly of said throat and converging downwardly from said base end to the vortex chamber at a position adjacent to the upper end thereof and in which said inlet extends through said sidewall of the swirling chamber.

9. The separator of claim 8 in which the swirling chamber is closed upwardly of said sidewall by an upwardly convex closure interconnecting said base end with the vortex finder.

10. A centrifuging device for separating particulate solids from a fluid stream consisting of a liquid carrying solid particles therein, said device having particular utility in boreholes of restricted cross-sectional area comprising:

(A) a vortex chamber adapted to be received in such a borehole having a sidewall providing an inwardly disposed surface of revolution disposed concentrically about an axis, an open upper end and a substantially closed lower end;

(B) a tubular vortex finder extended concentrically in the upper end of the chamber and therewith defining an annular throat about the vortex finder;

(C) an annular swirl inducing plate mounted in concentrically circumscribing relation to the upper end of the chamber having an inner edge connected to the chamber, a circular outer edge, and a fluid admission port tangential to a circle concentric to the axis providing a downwardly disposed intake end externally of the chamber and an upwardly disposed outlet end;

(D) wall means having an inwardly disposed surface of revolution concentric to said axis interconnecting the outer edge of the plate and the vortex finder; and (E) means for applying a fluid pressure differential to the port and the vortex finder whereby the fluid enters upwardly through the port and is swirled thereby, swirls about the vortex finder downwardly through the throat, and swirls in the chamber to throw the particles outwardly for descent to the lower end thereof while the fluid returns upwardly and out of the vortex finder.

* * * * *